Oct. 5, 1926.  1,602,278
F. MANGE
CUTTING MATCH STICKS
Filed June 26, 1925   2 Sheets-Sheet 1
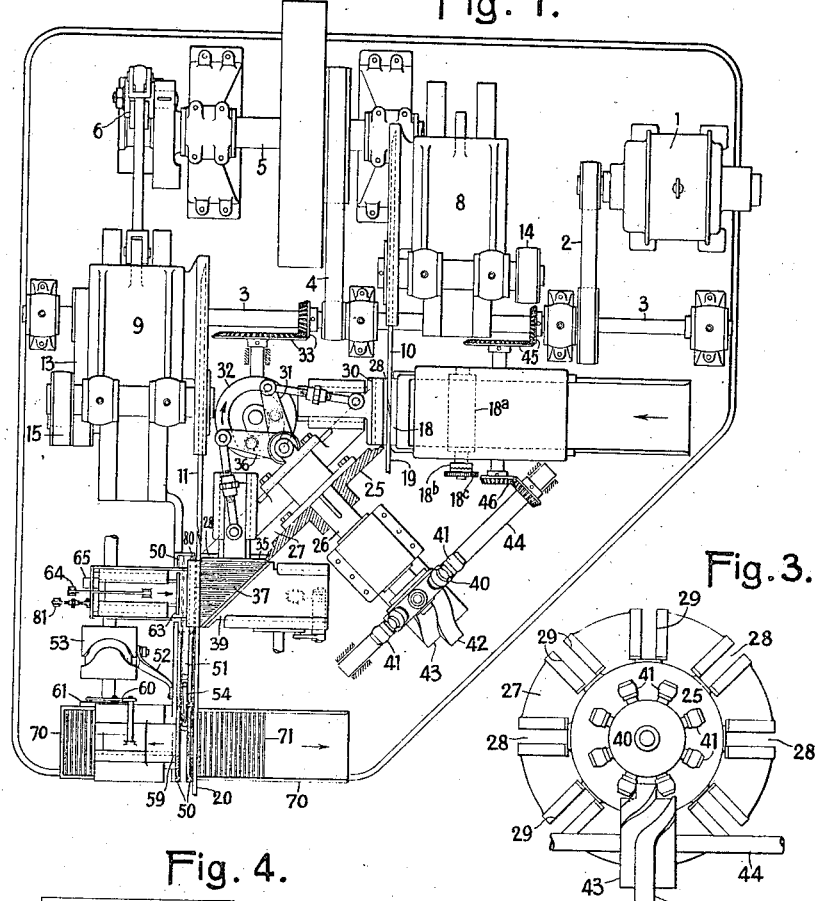
Fig. 1.
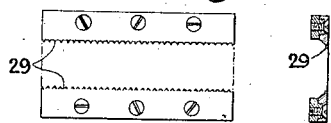
Fig. 4.
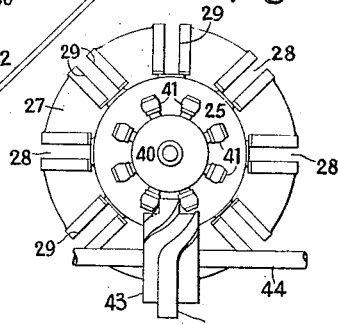
Fig. 3.
Fig. 5.
Inventor:
F. Mange
By Langner, Parry, Card & Langner
Attys.

Oct. 5, 1926. 1,602,278
F. MANGE
CUTTING MATCH STICKS
Filed June 26, 1925  2 Sheets-Sheet 2
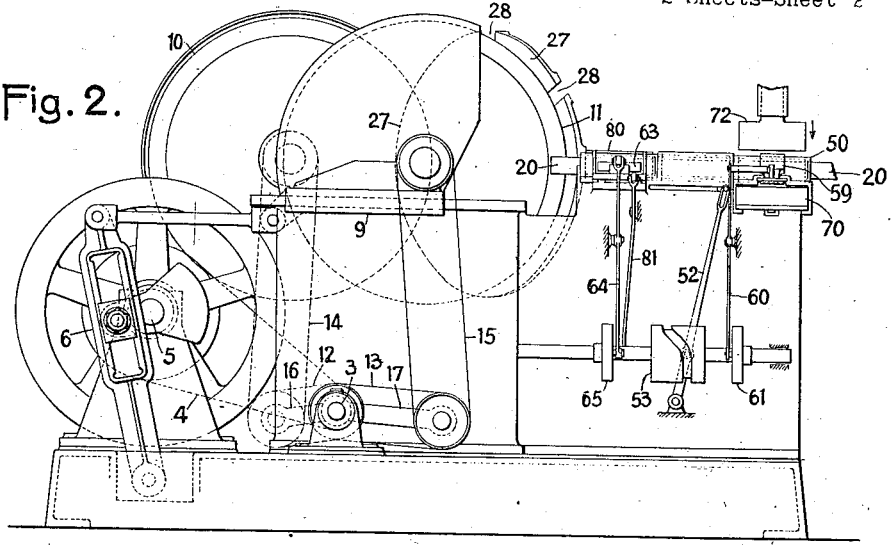
Fig. 2.
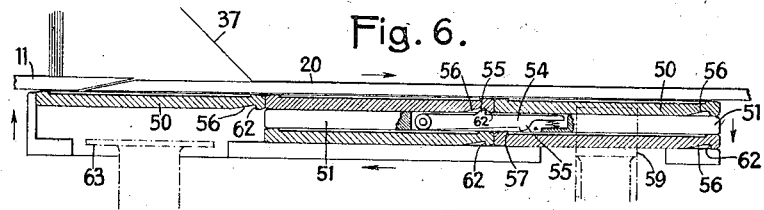
Fig. 6.
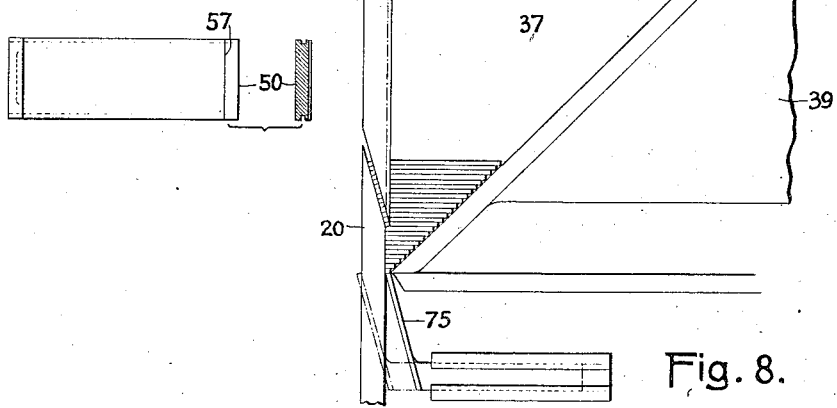
Fig. 7.
Fig. 8.
Inventor:
F. Mange
By Langner, Parry, Card & Langner
Attys.

Patented Oct. 5, 1926.

1,602,278

UNITED STATES PATENT OFFICE.

FRÉDÉRIC MANGE, OF PARIS, FRANCE.

CUTTING MATCH STICKS.

Application filed June 26, 1925, Serial No. 39,836, and in Switzerland July 10, 1924.

In hitherto known methods in which wooden sheets were fed to a cutting blade closely arranged side by side in a rectangular block to be cut cross-wise into match sticks, as soon as the block was still only of a length corresponding to four or five sticks in thickness the ends of the sheets were torn away by the pressure of the blade so that there was a considerable waste.

To prevent this and to obtain continuous and economical cutting of the match sticks, in the method according to this invention, the wooden sheets to be cut are fed to the cutting place with their rear ends in stepped formation, in such a way that whilst rows of sticks are continuously being cut off from the composite block, the block of sheets of varying length is continuously being completed by fresh sheets of the greatest length. By this method of operation the result is obtained that whilst the thickness of the pile or block of sheets remains constant the short sheet remainders at one side of the block are supported laterally by the longer sheets and owing to their adhesion, assisted by pressure, tearing away of the material to be cut is prevented.

For this purpose, the fresh sheets are fed laterally to the block of sheets being dealt with at the cutting place, and are of such a size that as they have their rear ends in stepped relation they will remain in alignment with the front surface of the block of sheets at the cutting place.

The apparatus for carrying out this method has the characteristic feature that the wooden sheets, which may be obtained in a known manner by cutting a wooden block, are fed to the cutting place to be cut crosswise into wooden sticks in an assembling receptacle disposed in front of this cutting place, in which simultaneously a row of sticks is separated from the block of sheets in the assembling receptacle at one side and a fresh sheet is supplied at another side. This apparatus enables wooden sticks to be cut in a continuous process and can be constructed in a very compact way.

In a preferred construction of the apparatus, the supply of the sheets to be cut to the assembling receptacle is effected by a feed wheel which moves step-by-step and has gripping recesses formed round its periphery for the individual sheets. This feed wheel in regular order presents an empty recess to receive a sheet at the place where the sheets are cut from a wooden block and presents a recess filled with a sheet at the assembling receptacle for feeding the fresh sheet thereto.

The accompanying drawings illustrate by way of example an embodiment of the apparatus according to the present invention.

Figure 1 is a plan view of the whole machine with parts in section;

Figure 2 is an end view thereof;

Figure 3 shows the above mentioned feed wheel with its driving means;

Figure 4 shows one of the eight gripping recesses of the feed wheel;

Figures 5, 6 and 7 relate to a mechanism for arranging the wooden sticks in a magazine;

Figure 8 is a diagrammatic view for explaining the working operation at the second cutting place.

An electric motor 1 (Figure 1) drives a main shaft 3 by means of a pulley drive 2. From this shaft is driven, by means of a pulley drive 4, a primary blade shaft 5, which reciprocates two slides 8, 9, carrying two parallel rotary circular blades 10, 11, through the agency of two crank slides 6 (of which only one is shown in Figures 1 and 2). The blades are continuously rotated by two pulley drives 14, 15, which in their turn are driven from the main shaft 3 through pulley drives 12, 13, on spring pressed levers 16, 17.

Of the circular blades 10, 11, the blade 10 in co-operation with a movable holding back rail 19 serves to cut the wooden block 18, of known substantially parrallelopipedon form which is moved forward in steps, into broad wooden sheets (laminæ), whilst the blade 11 in co-operation with a movable holding back rail 20 cuts these wooden sheets, which are arranged side by side in a composite block, cross-wise into wooden sticks in a direction at right angles to the first mentioned direction of cutting. In both cases the blade operates in such a way that in the forward movement of the blade and the simultaneous return movement of the corresponding holding back rail, the part severed by the rotary blade is moved away from the material to be cut by the oblique slot formed between the oblique ends of the blade and of the holding back rail and is pushed by the forward movement of the blade into a waiting reception space. This co-operation of blade and holding back rail is in itself known (see for example U. S. Letters Patent No. 1506850) and diagrammatically indicated in Figure 8 for the blade 11; for this reason therefore the means for operating the holding back rails are not shown. It is sufficient to mention that the holding back rails always follow the blades in their forward and backward movement thus preserving the said passage slot therethrough.

The forward movement of the wooden block 18 is effected by means of two feed rollers 18$^a$, between which the block passes and which are driven through ratchet couplings 18$^b$ by a driving member 18$^c$. For limiting the forward movement of the block 18 an abutment plunger 30 is provided, the function of which is to determine the thickness of the wooden sheet to be cut off. The abutment plunger 30 can be moved forwards and backwards and its operative position can be so adjusted that the thickness of the wooded sheets to be cut can be altered with a very slight amount of auxiliary mechanism. The means which are provided for this purpose are further described below.

From the first cutting place where the broad wooden sheets are cut from the block 18 by the blade 10, the sheets are supplied to an assembling receptacle at the second cutting place, through a movement in a plane which is at an angle of 45° to both directions of cutting. At the second cutting place the wooden sticks are separated from the joined up wooden sheets by the blade 11. The sheets are fed to said assembling receptacle by means of a conical feed wheel 25 which is rotatable step-by-step and is on a shaft 26 at an angle of 45° to the directions of cutting. The wheel 25 has a rim 27 of truncated conical form, around which a number of recesses 28, in this case eight, are equally spaced. At each step of the feed wheel 25 one of these recesses reaches a position in front of the first cutting place such that it can receive the severed wooden sheet. For this purpose each of these recesses is provided with a finely toothed grip 29, shown in front view and cross section in Figure 4, into the teeth of which the more or less moist sheet is pressed by the severing action, so that it is held fast in the grip.

The abutment plunger 30 limiting the forward movement of the block 18 before the cutting process is slid up against the block through that recess of the feed wheel 25 which is situated in the receiving position and shortly after that, when the forward movement of the block 18 has ended, is again drawn back. It is so shaped that when slid forward it can take over the rail 19. The forward and backward movement of the abutment plunger 30 is effected through a lever 31 by a grooved cam 32, which is so rotated from the main shaft 3 by two sets of bevel gear, of which only one, 33, is shown, that before each cutting stroke of the blade 10 it slides the plunger 30 forwards to arrest the forward movement of the block and then draws it back again out of the recess 28 of the wheel 25 after the forward movement of the block has ceased.

After the abutment plunger 30 has moved back, a sheet is cut from the forwardly fed wooden block 18 by means of the now advancing blade 10, which pushes the separated wood sheet into the waiting recess of the feed wheel 25. Thereupon a partial rotation of the feed wheel takes place. The next recess is then in the same way provided with a wooden sheet and the wheel moves on another step and so forth.

Whilst a recess 28 of the feed wheel 25 thus receives a wooden sheet of a certain uniform thickness at the first cutting place, the wooden sheet of another recess of the feed wheel, which sheet, by the rotation of the wheel, has had its position displaced for an angle of 90°, is at the second cutting place, where the wooden sticks are to be cut from a series of joined up sheets by means of the blade 11. Here the newly fed sheet is pushed by a plunger 35, which is slid by means of a lever 36 actuated by the grooved cam 32, on to the wood sheets in the assembling receptacle 37 in such a manner that the sheet is ranged therein laterally against the other sheets to complete the block, the end of the sheet turned towards the cutting place being in alignment with the end face of the block, whilst the rear end of the fed sheet projects the thickness of a wooden stick beyond the rear end of the preceding sheet (Figure 8). Thus not only is the block of sheets in this assembling receptacle 37 compensated for the successive separation of sticks by the blade 11, but the individual sheets are pushed forward in an oblique direction against the cutting place, parallel to the staggered side of the block so that the sheets become successively shorter in the cutting process, but owing to the pressure at the newly supplied longer sheets always remain united together as a solid whole. The separation of the sticks is effected by the forward movement of the blade 11, whilst the wooden sheets are held in the assembling receptacle 37 at one side in the way shown in Figure 1 by the feed plunger 35, and at the other side by a movable counterpressure rail 75 shown in Figure 8 and are supported at the back by a pressure plunger 39. The means for operating this pressure plunger 39 can be of any desired type; but in connection therewith it should be noted that it must provide the necessary pressure at the back for the sheets during the whole period of cutting. Whilst the feed plunger 35 is drawn back to enable the feed wheel to move on and the pressure plunger 39 is released before the addition of a fresh wooden sheet, the sheets, in the assembling receptacle 37, are held by a base and a cover wall which are adapted for this purpose. This feature is not illustrated; for example, spring pressed ribs can be carried in grooves in the edges of the base and cover walls of the assembling receptacle, which prevent undesired displacement of the contents of the assembling receptacle.

The cutting position of the series of wooden sheets in the assembling receptacle 37 is determined by a forked abutment plunger 80, which is pushed forward during the forward movement of the pressure plunger 39 and forms an abutment with the upper and lower legs of its fork for the series of sheets. For allowing the wooden sticks to be cut by the blade 11 the abutment plunger 80 is drawn back by its control lever 81 so as to leave the assembling receptacle free.

The wheel 25 is driven by a toothed gear wheel 40 whose teeth 41 co-operate with a worm rib 42 in such a way that at each rotation of the latter the gear wheel 40 moves on one step corresponding to the spacing of the recesses 28 of the feed wheel 25. The worm rib 42 is formed on a sleeve 43, which is fast on an intermediate shaft 44, the latter being driven from the main shaft 3 through two sets of bevel wheels 45, 46.

The wooden sticks cut off by the blade 11 are pushed into a longitudinally movable conveying slide 50, which for this purpose is hollowed out at the front to receive the wood sticks. Five of these conveying slides 50 are provided (Figure 6) and one of them is shown in face view and cross section in Figure 7. These conveying slides exchange their positions one after the other, that is, they first make a forward movement on a rail guideway along the rail 20, whilst they each are loaded with a row of sticks, then a short cross-wise movement, then after emptying a return movement and finally they make another cross-wise movement to go into the loading position. The path of each conveying slide 50 is the same and is indicated by the arrows in Figure 6. This is so controlled that at each cutting stroke of the blade 11 one of the conveying slides is ready in position to be charged, whilst another conveying slide is in position for discharging its contents into a magazine 70.

The control of the conveying slides 50 is effected by a movable transporting slide 51, which is reciprocated by a lever 52 co-operating with a rotating grooved cam 53. The slide 51 carries a spring pressed pawl 54 which is provided both on the front and on the back with a tooth 55. When the slide 51 moves in Figure 6 to the left, the front tooth 55 of the pawl 54 slides on an oblique surface 56 of one of the front conveying slides, the pawl 54 is pressed back and the back tooth 55 engages on the edge 57 of the back conveying slide to the right in Figure 6 and thus as the transporting slide continues its movement it takes the two back conveying slides with it to the left. In the back end position of the transporting slide 51 the front conveying slide 50 at the right in Figure 6, which in this position is held in a reciprocatable gripping catch 59 (Figure 5) and in the meantime is emptied into the magazine 70, is returned by sliding back the catch 59 by means of a lever 60 co-operating with a grooved cam 61 (Figure 2) to the free position in the back part of the rail guideway. On reversal of the movement of the transporting slide 51 the pawl 54 engages with its front tooth on the tooth 62 of the loaded conveying slide at the front on the left and carries thus the latter together with the preceding loaded slide to the right, so as to convey the latter into the emptying position. When this has occurred the slide now at the back on the left in Figure 6 is moved by a plunger 63, which is actuated by a lever 64 from a grooved cam 65 (Figure 2), into the loading position for taking up a new row of sticks, whilst the slide now situated at the front on the right in Figure 6, and held in the catch 59 is emptied into the magazine 70. In this way each slide at the outermost position at the front to the left in Figure 6 is filled with a row of wooden sticks, and is emptied into the magazine at the outermost right position in front, whilst when returning it is empty.

The magazine 70 is divided into transverse compartments by partitions 71 as shown in Figure 1 so that each of the compartments may receive a row of wooden sticks. The magazine 70 is moved forward periodically, by a mechanism not shown, by an amount equal to the distance between two successive compartments. In the emptying position one of the conveying slides is substantially vertically above one of the compartments of the magazine. The discharge of the row of sticks in this slide 50 into the compartment of the magazine below it is effected by means of a pusher 72 which is moved down from above by a gear 73 (Figure 5) into the hollowed out part of the slide and pushes the row of sticks down into the compartment of the magazine.

As mentioned above, the forward movement of the wooden block 18 is controlled by the abutment plunger 30 and that of the block of wooden sheets in the assembling receptacle 37 by the abutment plunger 80 in so far as the two plungers limit the forward movement of the material to be cut. The operative abutment position of both plungers is so adjusted that the resulting wooden sticks are substantially square in cross section. These abutment plungers, however, also afford the possibility of altering the size of the cross section of the resulting sticks. For this purpose the rods which connect the abutment plungers 30, 80 to their operating means are divided and their parts joined together by an adjustment nut with left and right handed threads so that the effectual length of the rods can be shortened or lengthened, thus enabling the operative abutment position for each plunger to be altered. This feature is shown clearly in Figure 1 especially for the plunger 30.

The whole mode of operation of the machine is briefly as follows:

At every cut of the blade 10 a broad wooden sheet is cut off from the forwardly fed block 18 and is pushed into the waiting recess of the feed wheel 25, whilst out of another previously filled recess of the same wheel a wooden sheet at right angles to the direction of cutting of the blade 10 is fed into the assembling receptacle 37, to complete the block of sheets therein and to be moved forward obliquely and become successively shortened. The blade 11 which moves in a plane perpendicular to the broad flat side of the sheets in the assembling receptacle 37, cuts through the whole series of sheets in the same from the longest one which has just been supplied to the shortest at the other side of the series and thus cuts off a number of wooden sticks, whose thickness corresponds to the forward movement of the wood sheets and the stepped relation of their other ends in the assembling receptacle.

To set the machine in operation when the assembling receptacle 37 is empty a proper block of wooden sheets made by hand is inserted or, if some false cuts are not objected to, the machine can simply be set in operation and the assembling receptacle, in which the loose sheets even under these circumstances are maintained in position to a certain degree, is gradually filled up by the action of the feed wheel 25.

What I claim is:

1. A process for cutting wooden match sticks from wooden sheets, consisting in ranging wooden sheets side by side to initially build up a composite block, advancing same intermittently along an oblique guide member, cutting the sheets of said block perpendicularly to their faces to sever a row of match sticks and thereupon supplying a fresh wooden sheet to said block to thus complete the same.

2. An apparatus for cutting wooden match sticks from wooden sheets, comprising an assembling receptacle for building up a composite block of adjacent wooden sheets with lengths decreasing in successive steps from a greatest to a shortest one, means for cutting this composite block transversely to its sheets to sever a row of match sticks and a supply device to feed fresh wooden sheets of the greatest length to said assembling receptacle to thus complete the block.

3. An apparatus for cutting wooden match sticks from wooden sheets, comprising an assembling receptacle for building up a composite block of adjacent wooden sheets with lengths decreasing in successive steps from a greatest to a shortest one, means for cutting this composite block transversely to its sheets to sever a row of match sticks at the front side of the block and a supply device to feed fresh wooden sheets of the greatest length to said assembling receptacle at another side of the block therein to thus complete the same.

4. An apparatus for cutting wooden match sticks from wooden sheets, comprising primary cutting means to divide a wooden block into sheets, an assembling receptacle for building up a composite block of adjacent wooden sheets with lengths decreasing in successive steps from a greatest to a shortest one, secondary cutting means for this composite block to sever a row of match sticks at the front end of the block and an intermittently rotating supply wheel between the primary cutting means and the assembling receptacle for automatically feeding fresh wooden sheets of the greatest length to said receptacle onto one side of the block to thus complete the same.

5. An apparatus for cutting wooden match sticks from wooden sheets, comprising primary cutting means to divide a wooden block into sheets, an assembling receptacle for building up a composite block of adjacent wooden sheets with lengths decreasing in successive steps from a greatest to a shortest one, secondary cutting means for this composite block to sever a row of match sticks at the front end of the block and an intermittently rotating supply wheel between the primary cutting means and the assembling receptacle for automatically feeding fresh wooden sheets of the greatest length to said receptacle onto one side of the block, said supply wheel comprising recesses with gripping members to receive sheets one by one from the primary cutting means and to convey them successively to the assembling receptacle for completing the block.

6. An apparatus for cutting wooden match sticks from wooden sheets, comprising primary cutting means to divide a wooden block into sheets, an assembling receptacle for building up a composite block of adjacent wooden sheets with lengths decreasing in successive steps from a greatest to a shortest one, secondary cutting means for this composite block to sever a row of match sticks at the front end of the block and an intermittently rotating supply wheel between the primary cutting means and the assembling receptacle for automatically feeding fresh wooden sheets of the greatest length to said receptacle onto one side of the block, said supply wheel comprising a conical rim and recesses therein with gripping members to receive sheets one by one from the primary cutting means and to convey them successively to the assembling receptacle so as to present them thereto in a position turned over 90° with respect to the receiving position, for the purpose of delivering them to the block in the assembling receptacle.

7. An apparatus for cutting wooden match sticks from wooden sheets, comprising primary cutting means to divide a wooden block into sheets, an assembling receptacle for building up a composite block of adjacent wooden sheets with lengths decreasing in successive steps from a greatest to a shortest one, secondary cutting means for this composite block to sever a row of match sticks at the front end of the block and an intermittently rotating supply wheel between the primary cutting means and the assembling receptacle for automatically feeding fresh wooden sheets of the greatest length to said receptacle onto one side of the block, two plungers being provided to form parts of said receptacle, of which one is arranged to transfer at the same time the wooden sheets from the supply wheel to the receptacle, whilst the other constitutes a rear abutment for the sheet block, to cause a forward movement thereof with regard to the secondary cutting means.

In witness whereof I have hereunto signed my name this 9th day of June 1925.

FRÉDÉRIC MANGE.